United States Patent [19]

Pape et al.

[11] 4,377,750
[45] Mar. 22, 1983

[54] PASSIVE DISPLAY DEVICE

[75] Inventors: Heinz Pape, Munich; Ferdinand Quella, Gauting, both of Fed. Rep. of Germany

[73] Assignee: Siemens Aktiengesellschaft, Berlin & Munich, Fed. Rep. of Germany

[21] Appl. No.: 184,003

[22] Filed: Sep. 4, 1980

[30] Foreign Application Priority Data

Oct. 11, 1979 [DE] Fed. Rep. of Germany ....... 2941313

[51] Int. Cl.³ .............................................. F21V 9/16
[52] U.S. Cl. .................................. 250/458.1; 40/542; 250/462.1
[58] Field of Search ................... 250/458, 459, 461 R, 250/462, 484; 40/542, 582, 583

[56] References Cited

U.S. PATENT DOCUMENTS

| 3,879,611 | 4/1975 | Schroeder | 250/462 |
| 4,016,450 | 4/1977 | Balekjian | 250/462 X |
| 4,038,552 | 7/1977 | Ciofalo | 250/462 |
| 4,298,802 | 11/1981 | Quella et al. | 250/484 |

Primary Examiner—Davis L. Willis
Attorney, Agent, or Firm—Hill, Van Santen, Steadman, Chiara & Simpson

[57] ABSTRACT

A passive display device particularly useful for signs and reflectors and not requiring any light source characterized by a device for entrapping light and then emitting entrapped light at given positions at an increased intensity. The device for entrapping light includes at least one transparent fluorescent member having an index or refraction greater than 1 and containing fluorescent particles which collect impinging light by fluorescent scattering with subsequent reflection on the boundary surface of the member and the device has output coupling zones which are disposed on one of the members such as the fluorescent member in a desired pattern for uncoupling light from the device in a desired pattern. The device may include phosphorescent particles, which will emit light during periods of darkness and which may be either scattered through a member or applied at the uncoupling zones so that the light being uncoupled is a phosphorescent light. The device may include more than one member which will entrap light and preferably all of the elements of the device will act to entrap light with some of the members being free of fluorescent particles while others contain the fluorescent particles.

12 Claims, 4 Drawing Figures

PASSIVE DISPLAY DEVICE

BACKGROUND OF THE INVENTION

The present invention is directed to a passive display device particularly useful for signs and reflectors such as house numbers, automobile license plates, door signs, traffic signs, warning signs, advertisements, reflectors for bicycles and automobiles, road markers and light conducting tracks or indicators which are easily recognizable both during the day and night and do not require any external light source.

The recognizability of different signals or displays up to the present time have been accomplished in various ways. For example, in the case of house numbers and automobile license plate numbers as well as door warnings and traffic signals all use a strong contrast for example a bright indication on a dark background. In the case of signs such as traffic signs and warning signs, an application of fluorescent or phosphorescent coatings has been used and the coating will luminesce when irradiated.

In advertising signs, one possibility was to utilize additional illumination such as from gas discharge tubes to create the display. In the case of reflectors such as reflectors which may be used either on automobiles or bicycles, an increased display reflection was obtained by utilizing back scattering elements. For road markers, for example, light guide tracks and lane markers, the display used either back scattering elements or phosphorescent coatings of paint to provide an improvement of the recognizability from direct irradiation.

SUMMARY OF THE INVENTION

The present invention is directed to providing a passive display device of the simplest possible construction for use as either signs or reflectors and whose recognizability is guaranteed during both days and nights.

This object is achieved by a passive display device comprising means for entrapping light and emitting light at a given position at an increased intensity, said means including at least one transparent fluorescent member having an index of refraction $n > 1$ and containing fluorescent particles, said fluorescent particles collecting impinging light by fluorescent scattering with subsequent reflections on the boundary surfaces of said member; and output coupling zones being disposed on said member in a desirable pattern for uncoupling light from the device at a concentrated intensity.

The recognizability of the signs or reflectors of the displays manufactured in accordance with the present invention is guaranteed during the day be virtue of the fact that the ambient light is collected by the fluorescent member and the fluorescent light is emitted through the output coupling zone which may be either reflectively coated notches or grooves or pigment layers on the surface of the member. In the case of fog, such signs will radiate in a particular conspicuous fashion since the short wave exciting light in comparison to the visual component is still represented with a very high intensity. At night, these elements can emit light through the light collection during irradiation, for example from headlights or spotlights. Advantageously, the absorption spectrum of the fluorescent particles is adapted or matched to the filament lamp spectrum of the headlights by utilizing more than one group of fluorescent particles in a manner proposed in our copending U.S. patent application Ser. No. 125,496, which was filed Feb. 28, 1980, was issued as U.S. Pat. No. 4,298,802 and was based on German patent application P No. 28 08 770.5. The disclosure of our copending application is incorporated by reference thereto.

A particular advantage of the passive displays of the present invention as compared with conventional displays consists in that the light is collected over a large surface area mainly on surfaces which do not directly belong to the area of the signal and is then conveyed through by light conduction to output coupling zones. In the case of uniform illumination of the fluorescent member, the light intensity of the output coupled signal by a first approximation as compared with a coat of paint of the same fluorescent color is increased by a factor which is proportional to the ratio of the area of the collector surface of the fluorescent member to the area of the output coupling zones.

In accordance with a further development of the present invention, the fluorescent member can be provided with phosphorescent pigments in the output coupling zone as suggested and disclosed in our copending U.S. Application Ser. No. 171,458 filed July 23, 1980, now abandoned and based on German Patent Application P No. 29 30 137.1. Due to the phosphorescent light emitted by the pigments, the display device will have a recognizable signal both during the day and night.

In order to achieve a greater contrast of the signal in relation to the environment or in order to facilitate the excitation of the phosphorescent pigments in the output coupling zone, the portion of the member adjacent the phosphorescent pigments may be of a clear transparent material which is free of the fluorescent particles. This can be accomplished by either providing a portion without any particles or destroying the particles in selected portions of a member by a radiation with an ultraviolet light as discussed in the copending U.S. Patent application Ser. No. 171,458 whose disclosure is incorporated by reference thereto.

By the provisions of the phosphorescent pigments, the light collecting effect is thereby virtually not obstructed. During daytime the display device will emit a light pattern by utilizing ambient light whereas at night the light pattern will result without irradiation due to the phosphorescent pigments. The decay time of the phosphorescent pigments lies on the order of the magnitude of hours. In the case of a passing or transient irradiation for example that which is created by automobile headlights or in a stairwell illumination, additional new excitation of the phosphorescent material will take place during the dark or night time hours. Since this arrangement enables the elimination of direct illumination, it is particularly suited for energy saving uses.

For improved recognizability in the case of house numbers and automobile plates, these numbers or plates can be manufactured from a synthetic foil or sheet containing the fluorescent particles and then subsequently printed or impressed only in the areas of the output coupling zone with the particles which act to form out coupling or exit windows for the member. Further applications of the use of the synthetic foils having output coupling zones formed by impressed pigments could be traffic signs, warning signs, advertisements, reflectors such as used on bicycles and automobiles, light guide tracks and lane markers. Favorable dyes for warning colors, for example, in the case of traffic signs and warning signs, are red and orange fluorescent colors.

In accordance with a further development of the invention, the entire display device is designed as a light collecting device. This applies to the devices used as reflectors or light guide tracks in order to be able to collect as much ambient light and/or beamed in light as possible. In such an instance, also, the phosphorescent pigments are frequently located in the output coupling zones.

In some instances, a translucent or light transmitting housing can be additionally provided in order to cover the fluorescent colors. This does not obstruct the function of the light collecting device as long as no optical contact exists with this covering except at the output coupling locations.

The solution in accordance with the present invention does not preclude an additional illumination, for example a light source or number plate illumination. Thus artificially produced light from the light source will be collected by the display device and emitted in a concentrated fashion. Any exterior irradiation other than from the light source would further increase the light intensity at the output coupling locations.

The manufacture of the passive display device in accordance with the present invention proceeds preferably from highly transparent synthetic materials, for example, polymethylmethacrylate which may be formed by injection molding, compression or pressing or by deep drawing and which can be provided with the fluorescent particles directly during the production steps. Also, the application of the fluorescent particles can be obtained by other means such as dipping or immersing the member into a fluorescent dye or particle solution.

In order to emit a greater portion of the collected light only through the output coupling locations, it is advantageous in some instances to make the edge surfaces of borders of each of the plate like members reflective or to provide them with a back scattering pigment. Thus, these border or edge surfaces are provided with a reflective layer which could be either a metallic layer, dielectric reflective layers or a diffused reflector such as formed by back scattering particles.

Within the framework of the invention, a member of the display device can also be provided, which consists of a solid transparent material in which phosphorescent particles have been incorporated instead of limiting the phosphorescent particles to the output coupling zone or exit windows. A particular advantage of this member consists in that it represents an active light source in darkness which is cheap, sturdy, handy and above all capable of frequent and multipurpose uses. For example, one might consider a simple plate or the borders of a reflecting warning triangle. Either an agricultural or forestry vehicle, which is located at the edge of a highway in darkness, or a broken down passenger vehicle can be readily rendered clearly visible by placing one or more of these phosphorescent members on the vehicle. These members can be carried along either in the glove compartment or in a bag on the tractor cab of the vehicle and these phosphorescent members will become excited when headlights are directed thereat. Such phosphorescent members have an advantage when compared with previously known devices. For example, when compared to a phosphorescent coats of paints or adhesive foil, the member having the phosphorescent particles of the present invention has the advantages of being mobile, multipurpose or versatile, soil and weather proof, and frequently usable. When compared to reflectors, the member, which contains phorphorescent material in accordance with the present invention, has the advantages of being self illuminous and being storable without breaking or without soiling. When compared to lamps, which are either battery powered or burn a combustible fuel, the display device of the present invention, which has the phosphorescent particles, has the advantages of being cheaper and simpler, and it is less accessible to either break downs or failures and is less susceptible to theft. In addition, the display of the present invention will frequently provide protection of a vehicle for several hours.

Because of its light weight and mobility, the display, which contains the phosphorescent particles, can in addition be used by a pedestrian to increase the safety of the pedestrian in darkness.

DESCRIPTION OF THE PREFERRED EMBODIMENTS

Figure 1:
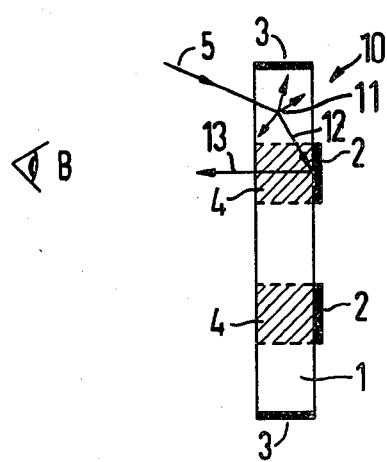
FIG. 1 is a schematic illustration of a passive display device in operation as a sign in accordance with the present invention.

The principles of the present invention are particularly useful in a flat display device which is generally indicated at 10 in FIG. 1. The flat display device is formed by a fluorescent member 1, which is a plate of a transparent material containing fluorescent centers such as 11. To form a symbol, an output coupling zones or exit windows 2 are provided on a surface of the fluorescent member 1 and can be arranged in any particular pattern of a symbol or character. The output coupling zones 2 can be formed by a pigment layer which is pressed or imprinted on the surface of the member 1 or can be formed by grooves or notches which are provided with a reflective coating. In addition, the exit windows can be formed by a roughened surface. When utilizing a layer of pigment, the pigment may have a color such as white or be a colored pigment or even a phosphorescent or fluorescent pigment.

The plate or member 1 on its edge surfaces, which are not to have light coupled therefrom, is provided with a reflective layer 3. The reflective layer 3 may be formed by dielectric coatings, metallic coatings, or back scattering coatings.

As illustrated, ambient light, which is indicated by the arrow 5, will enter the plate or member 1 and be absorbed by a fluorescent center 11 which will emit fluorescent light that is trapped in the plate due to a substantial total reflection at the boundary surfaces. The fluorescent light is indicated by a wave 12 which strikes the pigment layer 2 forming the output coupling zone and is scattered or reflected to be output coupled from the plate as indicated by the arrow 13 to be received by an observer or viewer B.

If the pigment layer or the output coupling zone 2 is formed by a phosphorescent pigment layer, it is desirable that the plate 1 immediately in front of the layer 2 have zones or portions 4, which are illustrated by the shading and are free of fluorescent pigments or dyes. By being free of the fluorescent material, the phosphorescent light indicated by the arrow 13 is free to pass through the zone 4 without being absorbed. To produce the zones 4, the plate 1 can be formed of a composite of several transparent members with the transparent portion in the zones 4 being free of the fluorescent material or the fluorescent material in the zones 4 can be destroyed by being subjected to ultraviolet light.

Figure 2:
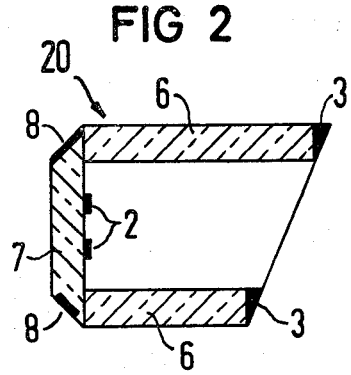
FIG. 2 is a cross-sectional view of a reflector or rear tail light in accordance with the present invention.

An embodiment of the display is generally indicated at 20 in FIG. 2 and is in the form of a reflector such as used as a rear tail light of a motor vehicle. In the display device or reflector 20, a fluorescent member consists of a front plate 7 and a tubular member 6 which are both light collectors and contain the fluorescent particles or dyes. As illustrated, the member 7 is in optical contact with an end surface or edge of the member 6 so that light entrapped in the member 6 can be conveyed into the member 7. To facilitate and aid the conduction of light between the members 6 and 7, the member 7 has beveled corners provided with a reflecting layer such as mirror 8. The other edges of the member 6 is provided with reflective layers 3 and the light output coupling zones 2 can be formed of pigments such as phosphorescent pigments as desired. It should be noted, that if phosphorescent pigments are used to form the output coupling zones 2, preferably the member 7 will have the zones similar to the zones 4 which are free of the fluorescent material. It is also noted, that additional illumination may be provided and be in the form of a lamp or light source received in the tubular member 6.

Figure 3:
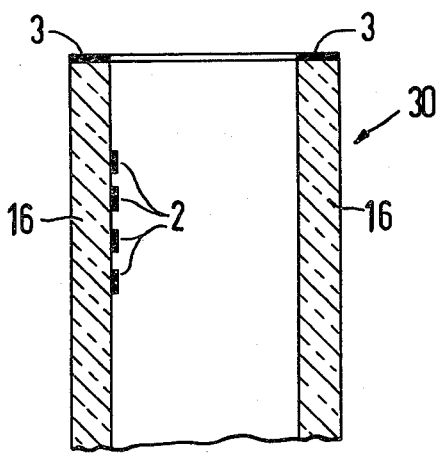
FIG. 3 is a cross-sectional view of a cylindrical lane edge marker post in accordance with the present invention.

Another embodiment of the display device is generally indicated at 30 in FIG. 3, and is a lane edge marker post which has a cylindrical fluorescent member or sheath 16. The output coupling locations 2 are positioned on the inner surface of the member 16 for output coupling light and can be either transparent grooves or notches provided with reflective layers or can be the pigments layers discussed hereinabove.

The cylindrical edges of the cylindrical sleeve 16 are provided with reflective layers such as 3 which can be either a metallic coatings, dielectric coatings or imprinted back scattering pigments. As in the previous embodiments, it is noted that the light gathered in the member 16 will be uncoupled with a high intensity from the uncoupling zones 2 which have the desired pattern which may be of that of a symbol or character. Also, it is noted that the pigments forming the uncoupling zones or exit windows 2 may be phosphorescent which are excited by the fluorescent light of the fluorescent material.

Figure 4:
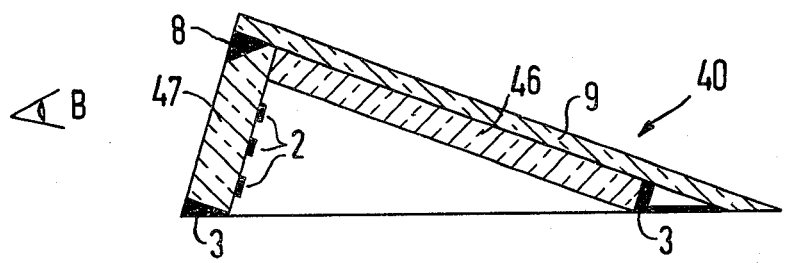
FIG. 4 is a cross-sectional view of a light guide track in accordance with the present invention.

Another embodiment of a display device is generally indicated at 40 in FIG. 4 and has a light collecting means formed by a plate 47 and a second member 46. As in the previous embodiment 20, the members 47 and 46 have edges in light communication and to facilitate transfer of light therebetween, a beveled edge is provided with a mirror or reflector 8. Also, the free edges of the plate 47 and the member 46 are provided with the reflective coatings 3. As illustrated, the member 47 is provided with output coupling zones or exit windows 2 for uncoupling light from an observer B and a housing 9 of a translucent, for example, white scattering material is disposed on an outer surface of the member 46.

It should be noted that in each of the embodiments, the output coupling zones of exit windows 2 can be formed of the phosphorescent material which preferably is of a type which would be exited by the fluorescent light created by the fluorescent particles in the members. It is also noted that if phosphorescent material is utilized in the coupling zones 2, immediately adjacent zones or portions, which are free of the fluorescent material such as zones or portions 4 (see FIG. 1) are provided.

Instead of utilizing phosphorescent material at the output coupling windows 2, the phosphorescent material can be scattered throughout each of the plates such as 1, 6, 7, 16, 47 or 46 if desired. In such an instance, phosphorescent material will emit a phosphorescent light when excited by the desired spectrum which preferably is that of the fluorescent material and preferably the phosphorescent light is not absorbed by the fluorescent particles.

Although various minor modifications may be suggested by those versed in the art, it should be understood that we wish to embody within the scope of the patent granted hereon, all such modifications as reasonably and properly come within the scope of our contribution to the art.

We claim:
1. A passive display device particularly useful for signs and reflectors and not requiring any light source comprising means for entrapping light and emitting light at a given position at an increased intensity, said means including at least one transparent fluorescent member having an index of refraction n greater than 1 and containing fluorescent particles, said fluorescent particles collecting impinging light by fluorescent scattering with subsequent reflections on the boundary surface of said member; and output coupling zones being disposed on said member in a desired pattern for uncoupling light from the device at a concentrated intensity.

2. A passive display device according to claim 1, wherein the means for entrapping light and them emitting light includes at least one additional transparent member free of fluorescent particles, said additional member being in optical communication with the fluorescent member and one of said members being provided with mirrors to enable guiding light therebetween.

3. A passive display according to claim 1, which includes reflective layers being deposited on each of the edge surfaces of said fluorescent member which edge surfaces are not to have light output coupled therefrom.

4. A passive display device according to claim 3, wherein said means for entrapping light and emitting light includes at least one transparent light conducting member for entrapping light therein, said transparent light conducting member being free of fluorescent particles and being in communication with the fluorescent member for conducting light thereto, said means including mirrors being disposed for guidance of light between said members.

5. A passive display device according to claim 1, which further includes phosphorescent particles being applied at the output coupling zones.

6. A passive display device according to claim 1, wherein the member having the output coupling zones is free of fluorescent material in the vicinity of each of said zones.

7. A passive display device according to claim 6, which includes phosphorescent particles being applied at each of the output coupling zones for releasing phosphorescent light in response to stimulation by the fluorescent light.

8. A passive display device according to claim 1, wherein the means for entrapping light and them emitting light includes all of the elements of said device.

9. A passive display device according to claim 1, wherein phosphorescent particles are incorporated in the transparent material to emit phosphorescent light for uncoupling from said uncoupling zones.

10. A passive display device according to claim 1, wherein the transparent fluorescent member contains fluorescent particles of two different groups with each group collecting light of different wavelengths and wherein at least one of the members includes phosphorescent particles being excited by one of the wavelengths of one of the groups of fluorescent particles to emit phosphorescent light for uncoupling from said uncoupling zones.

11. A passive display device according to claim 10, wherein the member having the phosphorescent material to form output coupling zones is free of fluorescent material in the vicinity of each of said zones.

12. A passive display device according to claim 11, which includes phosphorescent particles being applied at each of the output coupling zones for releasing phosphorescent light in response to stimulation by the fluorescent light, and said member having said zone being free of fluorescent material in a portion adjacent the phosphorescent material and between an observer and the phosphorescent material.

* * * * *